Figure 1:
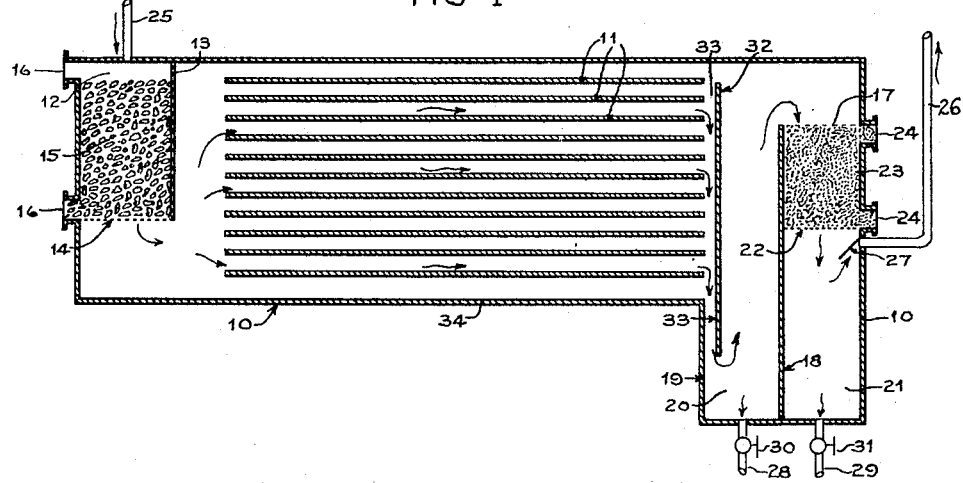

May 12, 1931. H. H. CANNON 1,804,743
APPARATUS FOR DESLUDGING LIQUIDS
Filed Feb. 16, 1929

HUGH HARLEY CANNON
INVENTOR
By Paul W. Prutzman
ATTORNEY

Patented May 12, 1931

1,804,743

UNITED STATES PATENT OFFICE

HUGH HARLEY CANNON, OF LOS ANGELES, CALIFORNIA, ASSIGNOR TO CANNON-PRUTZMAN TREATING PROCESSES, LTD., OF LOS ANGELES, CALIFORNIA, A CORPORATION OF CALIFORNIA

APPARATUS FOR DESLUDGING LIQUIDS

Application filed February 16, 1929. Serial No. 340,383.

An object of my invention is to effect a continuous separation of finely divided solids or gummy substances from liquids in which the finely divided matter is suspended and in which it is entirely or substantially insoluble.

A more particular object of my invention is to provide a quick and economical means for separating spent chemicals from oils which have been treated with such chemicals.

When petroleum products, as for instance gasoline or kerosene, are treated with sulfuric acid by agitation, an acid tar or sludge is formed, a portion of which is often or usually in a very finely divided state.

A satisfactory further treatment of such oil, as for instance a neutralization, can be produced only when this sludge has been completely removed from the oil. If any material proportion of sludge is left it is liable to be hydrolized by the neutralizing alkali, forming an oil-soluble bituminous product which imparts a permanent stain and other undesirable qualities to the neutralized oil.

Where such oils are being treated in large quantities, often many thousands of barrels per day in a single plant, the time required for the removal of the sludge by bulk sedimentation is so extended that very large and costly settling tanks are required, and during this long settling period other and highly undesirable secondary reactions between the acid and the oil are likely to occur. It is well known to be highly desirable to remove the sludge as completely and as promptly as possible and recourse has been had to various mechanical means, these means including filtration or percolation through sand packs, sawdust, or other solid matter, which act by coalescing the fine particles and causing them to settle more rapidly, and centrifuging, which acts by increasing the specific gravity difference between the oil and the sludge. Percolation is quite effective up to a certain point but is very slow if complete separation is required, while centrifugal apparatus is high in first cost and unduly expensive to operate.

I have discovered that if the velocity of a flow stream of oil containing sludge be greatly reduced while the stream is confined in a shallow channel, sedimentation takes place very rapidly because of the slight depth of the channel and the correspondingly short distance through which the sludge particles are required to travel. Further, that the sludge, when it once reaches the bottom of the channel, lays hold of such bottom and coalesces to form a thin sheet or layer which, if properly disposed of, cannot again become finely subdivided in the oil.

Figure 4:
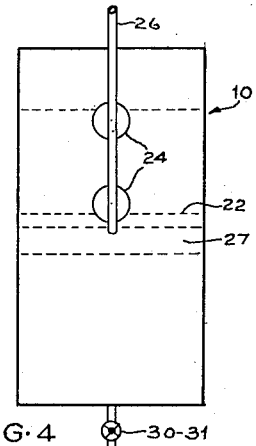
Figure 5:
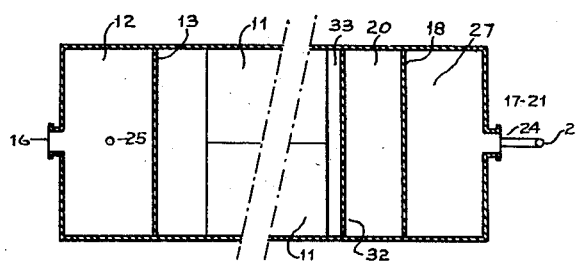

My improved apparatus for making use of this discovery consists of a shell set in a horizontal position and so connected that the oil passes through it horizontally. This shell should be of such vertical cross section that the stream of oil containing sludge will flow through it very slowly. The shell may be further divided into shallow channels by a plurality of horizontal partitions spaced, preferably, only a few inches apart, the flow of oil being parallel to these partitions. Such an apparatus in a preferable form is illustrated in the attached drawings in which, Fig. 1 is a longitudinal cross section of an apparatus provided with the aforementioned horizontal partitions and also with optional means for introducing the sludge-containing oil into the apparatus and for withdrawing the separated sludge and the oil from which the sludge has been separated, Fig. 2 is an elevation of the left or inlet end of the apparatus, Fig. 3 is a cross section through the body of the apparatus showing a preferred form for the horizontal partitions, Fig. 4 is an elevation of the right or outlet end of the apparatus, and Fig. 5 is a plan section of the apparatus.

Figure 2:
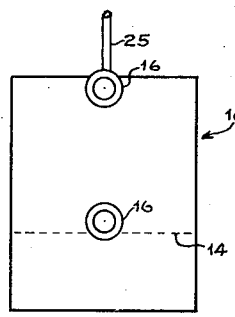
Figure 3:
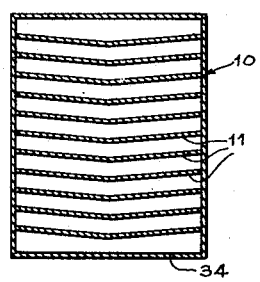

Referring to these drawings, 10 is a shell of sheet metal, which is preferably of the rectangular form indicated in Figs. 2 and 3.

11—11 are plates of thin sheet metal which preferably extend from side to side of the shell 10 and may be attached to such shell, or supported in any other convenient manner. These plates are preferably so formed that they are slightly lower at the center than at the sides, this lowering being accomplished either by bending the plate at its center line, as indicated in Fig. 3, or by giving the plate a slight downward curvature. It is also desirable, though not strictly essential, that the end of the plates nearest the outlet be slightly lower than the end toward the inlet in order that the sludge collecting on such plates may drain toward the outlet end of the apparatus.

12 is a chamber or pocket formed in the inlet end of the shell 10 by the partition 13. This pocket has a bottom plate 14 of stiff perforated metal on which rests a rather coarse wire screen not shown. The purpose of this bottom structure is to support the broken or granular filling material 15, the nature and purpose of which will be later described. The two nozzles 16—16, covered by removable plates, or any other preferred type of manhole or handhole, provide access to the interior of the pocket for the purpose of emptying, cleaning and filling.

A similar pocket 17 is formed in the opposite or outlet end of the shell 10 by the partition 18, which is carried to the bottom of a downward extension 19 of the main shell. By this partition the extension is divided into two pockets 20 and 21, the chamber 17 being merely the upper portion of the pocket 21. This chamber is separated from the lower portion of the pocket by the perforated metal sheet 22, on which, as before, a coarse wire screen is placed. The chamber 17 is filled with the broken or granulated material 23, to be described, and should be provided with the nozzles and plates 24—24, or an equivalent means of access to the interior.

An inlet pipe 25 communicates with chamber 12 to admit a mixture of oil and sludge to the apparatus, and an outlet pipe 26 communicates with chamber 21 to provide for outflow of sludge-free oil from the separator. A shield 27 of sheet metal should be placed over the inlet end of the outlet pipe 26 to prevent any sludge which may drip through the plate 22 from being carried into this pipe. This shield may be carried from wall to wall of the shell, as shown in Figs. 4 and 5, or if preferred it may be merely a semicircular canopy over this outlet. The drain pipes 28 and 29, controlled by valves 30 and 31, are provided for the withdrawal of sludge which collects in the bottoms of the pockets 20 and 21.

Near the right hand end of the assembly of plates 11—11 there may be a vertical shield or deflector 32, which preferably should not reach quite to the top of the shell and which must terminate materially above the bottom of pocket 20. This shield should reach from side to side of the shell, as shown in Fig. 5. This shield must be spaced far enough from the right hand ends of the plates 11 that the velocity through the channel 33 will be too low to cause turbulence in the bottom of the pocket. In other words, this channel must have several times the cross sectional area of the inlet pipe 25.

The chambers 12 and 17 may be filled with any material which has the property of agglomerating and coalescing finely divided particles of sludge. Such materials are, for example; broken rock or screenings, which may be from 1/8 inch mesh upward in size and which must not contain any lime or other material reactive with the sludge, coarse sand or grit or fine gravel, coarsely crushed pumice or brick, or any other material which affords a relatively large surface of contact and which is not effected by the acid or other sludge to be removed from the oil.

In its passage through the material contained in these chambers the finely divided sludge is, in part, coalesced to the form of films on the broken fragments, and as these films increase in thickness the sludge will detach itself from the fragments and make its way forward with the oil in the form of strings, fine streams or relatively coarse drops, all of which separate by gravitation more readily than the finer particles. The purpose of the pack 15 contained in chamber 12 is to prepare the oil-sludge mixture for more ready separation on the plates 11, while the purpose of the pack 23 contained in chamber 17 is to separate any finely divided sludge which may have escaped settlement on these plates. It should be understood, however, that the use of such packs in connection with the plates 11 is entirely optional, and that I do not claim them as such in this present application but only in combination with the use of a shallow horizontal sedimenting chamber.

The operation of my improved sludge separator is as follows. A mixture of oil or other liquid with any form of sludge or suspended matter is introduced through the pipe 25 under a pressure sufficient to carry it through the apparatus. If the chamber 12 and the pack 15 are used a partial separation of sludge from liquid will take place in the downward passage of the mixture through the pack, the two elements of the mixture passing downward through the perforated plate 14, after which the separated portion of the sludge will follow along the bottom plate 34 of the shell 10, while the oil, still containing some sludge, will distribute itself between the various flat channels formed by the plates 11. If the pack 15 is dispensed with the action is the same except that all the sludge enters the left end of these channels with the oil.

During the slow passage of the oil-sludge mixture through these channels, and because of the extreme retardation of velocity and the slight distance through which the sludge has to travel, the sludge completely separates from the oil or other liquid and deposits itself on the plates 11 in the form of a thin layer or film. This film travels toward the right end of the plates at a speed which will depend on the inclination given the plates and on the thickness of the sludge. Reaching the right end the sludge drips or strings downward through the channel 33 and thus reaches the bottom of the pocket 20, in which it accumulates and from which it must from time to time be withdrawn by opening valve 30 in the drain pipe 28.

The oil, now practically or entirely free from sludge, also enters channel 33 and may pass either over the top or under the bottom of the shield 32 and thus into the pocket 20, where there will be no tendency to again pick up sludge because of the low velocity of the liquid. It is preferable that the height of the shield be so adjusted that only a narrow channel, sufficient to prevent the accumulation of a gas pocket, is left at the top, so that the oil may be directed downwardly with the streams of separated sludge. If the main travel of the oil is upward, as it would be if a liberal space were allowed at the top of the shield and particularly if the bottom of the shield 32 were allowed to become submerged in the sludge layer accumulated in the bottom of the pocket 20, there might be some tendency for coarse particles of tar to be carried over the top of the shield. If the width of the pocket 20 is such as to entirely avoid turbulence the shield 32 may be entirely dispensed with and the effluent from the channels discharged directly into the pocket.

The separated oil, in either case, rises in the pocket 20 and flows over the partition 18 into the pocket 21. If the chamber 17 and the filling material 23 are used, any particles of sludge which may be carried forward from 20 will be entrained in 23 and will drip through the perforated plate 22 into the bottom of pocket 21, from which they may be withdrawn as the material accumulates by opening valve 31 in drain pipe 29. If the oil leaving the channels between the plates 11 is already entirely freed from suspended sludge, as will usually be the case, the separate pocket 21 may be combined with 20 by omitting the partition 18, the bottom plate 22 and the shield 27. This simplified arrangement will be entirely satisfactory unless the suspension is unusually obstinate.

In either case the finally separated oil is withdrawn through the outlet pipe 26, which must be carried above the top of the shell 10 in order that the entire apparatus may be kept filled with liquid at all times when in operation. If and when required, the apparatus may be entirely emptied by means of the drain valve 30 and 31.

The essence of my invention lies in the provision of a shallow horizontal channel or channels of such area that the oil will flow through them at a greatly retarded velocity and of such slight height that the suspended material will have but a short distance to travel by gravitation before it reaches a fixed surface to which it may attach itself. The provisions above shown for mechanically parting the separated sludge body from the flow stream of oil are not novel, nor are they essential to the successful application of the principle of my invention.

The efficacy of this apparatus depends on proper proportioning of its dimensions, and these cannot be stated in advance as they will vary with the nature of the materials to be separated and the quantity to be thus handled per unit of time. They may, however, be experimentally determined and calculated in the following manner.

A sample of this mixture which is to be separated being available, it may be readily determined by observation that a column of, for example, six inches height will separate by simple standing, to the desired approach to completeness, in a certain number of minutes. The quantity to be treated may be reduced to cubic inches per minute. The other two dimensions of the apparatus must be such that the given quantity will pass through it from end to end in a time not less than the number of minutes required for settling the six inch column, and there should be a further allowance of say twenty-five percent to allow for short circuiting through the central part of the shell. If therefore, we multiply the flow in cubic inches per minute by the time in minutes required for the settling of the six inch column, divide by six and add one-quarter to the quotient, the result will be the product of the length and breadth, both in inches, of a shell of minimum size. This product may be integrated as desired—the greater the length the less the required width—but the length should not in any case be less than twice the width and the ratio of length to width is preferably greater, as if the shell is too short and broad the travel is liable to be mainly through the center of the shell instead of substantially equal throughout its cross section, as it should be to get the greatest efficiency.

The figure of six inches for height is entirely arbitrary and any desired height may be used in proportioning the apparatus, but it should be noted that short columns settle with greater proportionate rapidity than longer ones, due probably to a gentle swirling motion, similar in its effect to a convection current, which is produced by the slow motion of the horizontal stream of liquid past the surfaces of the shell. Contrary to the effect of turbulence, which retards gravity separation, this slow internal motion has a material effect in agglomerating small particles of suspended matter and causing them to settle more rapidly, and for this reason a channel having its upper and lower surfaces approached to within a few inches is more effective than one of equal cross sectional area in which the height is greater and the width less. For the same reason, the actual output of a channel of slight height will usually be somewhat greater than would be indicated by the above test and calculation. It is therefore desirable to keep the height of the channel as slight as is consistent with reasonable first cost and ground space requirement.

I claim as my invention:

1. Apparatus for separating fluent sludge from a liquid in which said sludge is suspended, comprising: a substantially closed vessel horizontally disposed; imperforate partitions of less length than that of said vessel, so placed as to divide said vessel into a number of relatively wide and shallow substantially horizontal channels and to cause said liquid to flow through said channels in parallel, and means for introducing sludge-containing liquid into one end of said vessel and for separately withdrawing liquid and sludge from the opposite end of said vessel.

2. Apparatus for separating fluent sludge from a liquid in which said sludge is suspended, comprising: a substantially closed vessel horizontally disposed; partitions dividing said vessel into a number of relatively wide and shallow substantially horizontal channels; a sand pack communicating with one end of said vessel; means for introducing sludge-containing liquid through said sand pack into said vessel, and means at the opposite end of said vessel for separately withdrawing liquid and sludge.

3. Apparatus for separating fluent sludge from a liquid in which said sludge is suspended, comprising: a substantially closed horizontally disposed vessel divided into a number of shallow horizontal channels; means for introducing sludge-containing liquid into one end of said vessel; means at the opposite end of said vessel for withdrawing sludge; a sand pack disposed substantially above said sludge withdrawal means, and means for withdrawing separated liquid from said vessel through said sand pack.

4. Apparatus for separating fluent sludge from a liquid in which said sludge is suspended, comprising: a substantially closed vessel horizontally disposed; imperforate partitions of less length than that of said vessel, so placed as to divide said vessel into a number of relatively wide and shallow substantially horizontal channels and to cause said liquid to flow through said channels in parallel, the height of each said channel not exceeding six inches and the width of each said channel being not less than eight times the height; and means for introducing sludge-containing liquid into one end of said vessel and for separately withdrawing liquid and sludge from the opposite end of said vessel.

5. Apparatus for separating fluent sludge from a liquid in which said sludge is suspended, comprising: a substantially closed vessel horizontally disposed; imperforate partitions of less length than that of said vessel, so placed as to divide said vessel into a number of relatively wide and shallow substantially horizontal channels and to cause said liquid to flow through said channels in parallel, said partitions being given a slight downward slope toward the outlet end of the apparatus; and means for introducing sludge-containing liquid into one end of said vessel and for separately withdrawing liquid and sludge from the opposite end of said vessel.

6. Apparatus for separating fluent sludge from a liquid in which said sludge is suspended, comprising: a substantially closed vessel horizontally disposed; imperforate partitions of less length than that of said vessel, so placed as to divide said vessel into a number of relatively wide and shallow substantially horizontal channels and to cause said liquid to flow through said channels in parallel, said partitions being slightly depressed along their longitudinal center line; and means for introducing sludge-containing liquid into one end of said vessel and for separately withdrawing liquid and sludge from the opposite end of said vessel.

7. Apparatus for separating fluent sludge from a liquid in which said sludge is suspended, comprising: a substantially closed vessel horizontally disposed; imperforated partitions of less length than that of said vessel, so placed as to divide said vessel into a number of relatively wide and shallow substantially horizontal channels and to cause said liquid to flow through said channels in parallel, and means for introducing sludge-containing liquid into one end of said vessel and for separately withdrawing liquid and sludge from the opposite end of said vessel, said withdrawal means comprising; a chamber formed at the outlet end of said channels, a baffle plate extending across said chamber, spaced from the ends of said channels and leaving an opening between its upper and lower edges and the top and bottom respectively of said chamber; an outlet for liquid in the upper portion of said chamber and beyond said baffle in the direction of flow, and an outlet for sludge situated substantially at the bottom of said chamber.

8. Apparatus for separating fluent sludge from a liquid in which said sludge is suspended, comprising: a substantially closed vessel horizontally disposed; imperforate partitions of less length than that of said vessel, so placed as to divide said vessel into a number of relatively wide and shallow substantially horizontal channels and to cause said liquid to flow through said channels in parallel, the height of each said channel not exceeding six inches and the width of each said channel being not less than eight times the height; and means for introducing sludge-containing liquid into one end of said vessel and for separately withdrawing liquid and sludge from the opposite end of said vessel, said withdrawal means comprising; a chamber formed at the outlet end of said channels, a baffle plate extending across said chamber, spaced from the ends of said channels and leaving an opening between its upper and lower edges and the top and bottom respectively of said chamber; an outlet for liquid in the upper portion of said chamber and beyond said baffle in the direction of flow, and an outlet for sludge situated substantially at the bottom of said chamber.

9. Apparatus for separating fluent sludge from a liquid in which said sludge is suspended, comprising: a substantially closed vessel horizontally disposed; imperforate partitions of less length than that of said vessel, so placed as to divide said vessel into a number of relatively wide and shallow substantially horizontal channels and to cause said liquid to flow through said channels in parallel, said partitions being given a slight downward slope toward the outlet end of the apparatus; and means for introducing sludge-containing liquid into one end of said vessel and for separately withdrawing liquid and sludge from the opposite end of said vessel, said withdrawal means comprising; a chamber formed at the outlet end of said channels, a baffle plate extending across said chamber, spaced from the ends of said channels and leaving an opening between its upper and lower edges and the top and bottom respectively of said chamber; an outlet for liquid in the upper portion of said chamber and beyond said baffle in the direction of flow, and an outlet for sludge situated substantially at the bottom of said chamber.

10. Apparatus for separating fluent sludge from a liquid in which said sludge is suspended, comprising: a substantially closed vessel horizontally disposed; imperforate partitions of less length than that of said vessel, so placed as to divide said vessel into a number of relatively wide and shallow substantially horizontal channels and to cause said liquid to flow through said channels in parallel, said partitions being slightly depressed along their longitudinal center line; and means for introducing sludge-containing liquid into one end of said vessel and for separately withdrawing liquid and sludge from the opposite end of said vessel, said withdrawal means comprising; a chamber formed at the outlet end of said channels, a baffle plate extending across said chamber, spaced from the ends of said channels and leaving an opening between its upper and lower edges and the top and bottom respectively of said chamber; an outlet for liquid in the upper portion of said chamber and beyond said baffle in the direction of flow, and an outlet for sludge situated substantially at the bottom of said chamber.

In witness that I claim the foregoing I have hereunto subscribed my name this 4th day of February, 1929.

HUGH HARLEY CANNON.